(12) United States Patent
Kitahara

(10) Patent No.: US 11,780,387 B2
(45) Date of Patent: Oct. 10, 2023

(54) CLAMP AND CLAMP-EQUIPPED WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Yuta Kitahara, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 275 days.

(21) Appl. No.: 17/416,806

(22) PCT Filed: Oct. 2, 2019

(86) PCT No.: PCT/JP2019/038923
§ 371 (c)(1),
(2) Date: Jun. 21, 2021

(87) PCT Pub. No.: WO2020/137071
PCT Pub. Date: Jul. 2, 2020

(65) Prior Publication Data
US 2022/0055555 A1 Feb. 24, 2022

(30) Foreign Application Priority Data
Dec. 25, 2018 (JP) ................................ 2018-240849

(51) Int. Cl.
*F16F 3/12* (2006.01)
*F16L 3/08* (2006.01)
(Continued)

(52) U.S. Cl.
CPC ............ *B60R 16/0215* (2013.01); *F16F 3/12* (2013.01); *F16F 15/085* (2013.01); *F16L 3/08* (2013.01);
(Continued)

(58) Field of Classification Search
CPC ....... B60R 16/0215; F16F 3/12; F16F 15/085; F16F 2230/0005; F16L 3/08; H02G 3/0406; H02G 3/0456
(Continued)

(56) References Cited

U.S. PATENT DOCUMENTS 3,270,998 A * 9/1966 Keetch .................... F16F 1/426
267/140.3
5,190,251 A * 3/1993 Bodo ...................... F16L 3/237
248/68.1
(Continued)

FOREIGN PATENT DOCUMENTS

JP    H09-303621 A    11/1997
JP    2003-120862 A    4/2003
(Continued)

OTHER PUBLICATIONS

Dec. 17, 2019 International Search Report issued in International Patent Application No. PCT/JP2019/038923.

*Primary Examiner* — Timothy J Thompson
*Assistant Examiner* — Michael F McAllister
(74) *Attorney, Agent, or Firm* — Oliff PLC

(57) ABSTRACT

A clamp including: a holding portion and a fixing portion, wherein the fixing portion includes: a base, a support shaft that extends from the base in a direction away from the holding portion, a lock that is provided at a leading end of the support shaft and is formed to be able to be locked to the fixed portion, a spring that is provided in a surrounding region of the support shaft between the base and the lock,
(Continued)

and is formed so as to be extendable in a direction in which the support shaft extends, and a vibration suppressor provided between two opposing surfaces of the spring that are adjacent to each other in a direction in which the support shaft extends and face each other.

9 Claims, 5 Drawing Sheets

(51) Int. Cl.
    *B60R 16/02*     (2006.01)
    *F16F 15/08*     (2006.01)
    *H02G 3/04*     (2006.01)

(52) U.S. Cl.
    CPC ......... *H02G 3/0406* (2013.01); *H02G 3/0456* (2013.01); *F16F 2230/0005* (2013.01)

(58) Field of Classification Search
    USPC ...... 174/72 A; 285/61, 24; 248/74.2, 60, 71, 248/73
    See application file for complete search history.

(56) References Cited

U.S. PATENT DOCUMENTS

| | | | |
|---|---|---|---|
| 5,797,675 A * | 8/1998 | Tanner, Jr. | F21V 15/00 248/50 |
| 7,219,931 B2 * | 5/2007 | Kato | F16L 3/13 248/74.2 |
| 7,404,548 B2 * | 7/2008 | Kwilosz | F16L 3/1075 267/140.13 |
| 7,448,579 B2 * | 11/2008 | Kwilosz | F16L 55/035 248/74.1 |
| 8,066,250 B2 * | 11/2011 | Vukadin | F16B 21/088 248/65 |
| 2005/0098688 A1 * | 5/2005 | Miarka | F16L 55/035 248/74.1 |
| 2005/0139732 A1 * | 6/2005 | Kato | H02G 3/32 248/71 |
| 2006/0226301 A1 * | 10/2006 | Kwilosz | F16L 55/035 248/65 |
| 2007/0034769 A1 * | 2/2007 | Kwilosz | B60R 16/0215 248/565 |
| 2012/0267166 A1 * | 10/2012 | Wada | H02G 3/32 174/72 A |
| 2015/0233495 A1 * | 8/2015 | Shinoda | F16L 55/035 248/636 |

FOREIGN PATENT DOCUMENTS

| | | |
|---|---|---|
| JP | 2005-172229 A | 6/2005 |
| JP | 2009-068515 A | 4/2009 |
| JP | 2010-173400 A | 8/2010 |
| JP | 2015-082870 A | 4/2015 |

* cited by examiner

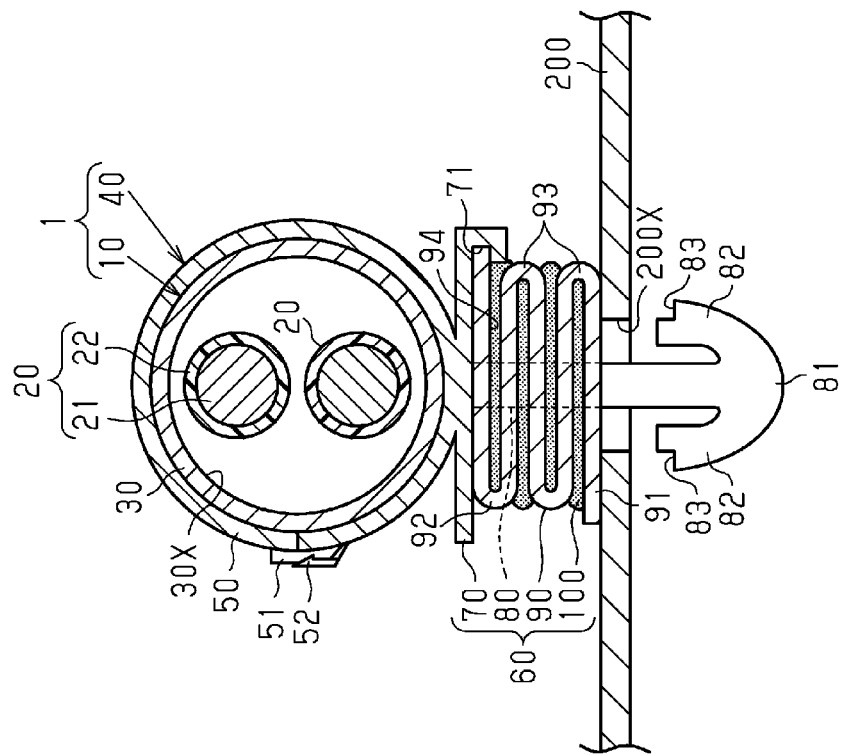
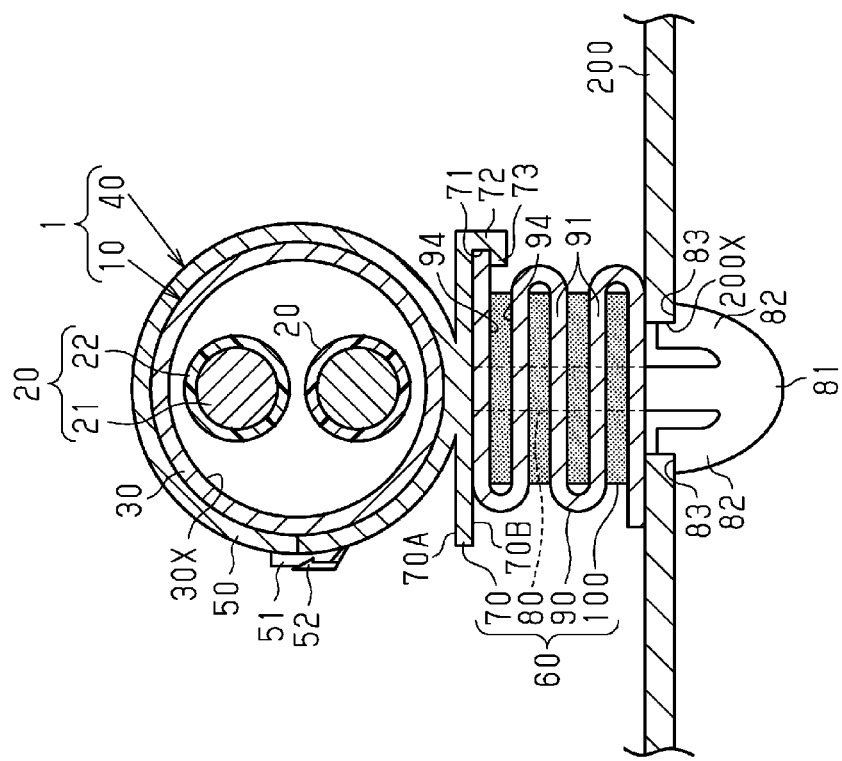

CLAMP AND CLAMP-EQUIPPED WIRE HARNESS

BACKGROUND

The present disclosure relates to a clamp and a clamp-equipped wire harness.

Conventionally, various clamps for fixing a wire harness to a fixed portion such as a vehicle body have been proposed (see JP 2015-82870A, for example). A clamp of this type has a holding portion for holding a wire harness and a fixing portion to be fixed to a vehicle body. The fixing portion includes a support shaft whose base end is connected to the holding portion, a locking portion that is formed at a leading end of the support shaft and is locked to the vehicle body, and a pair of coil springs that are provided on both sides with the support shaft interposed therebetween. Impact transmitted from the vehicle body to the wire harness via the clamp is absorbed by the pair of coil springs disposed in the surrounding region of the support shaft.

SUMMARY

However, there is still room for improvement in that, with the above-described clamp, a coil spring repeats simple vibration accompanying vibration of the vehicle body, and thus it is difficult to dampen vibration.

An exemplary aspect of the disclosure provides a clamp and a clamp-equipped wire harness that are capable of dampening vibration.

A clamp according to an exemplary aspect includes a holding portion configured to hold a wire harness and a fixing portion that is provided in a portion of an outer circumferential surface of the holding portion and is to be fixed to a fixed portion, in which the fixing portion includes a base, a support shaft that extends from the base in a direction away from the holding portion, a lock that is provided at a leading end of the support shaft and is formed to be able to be locked to the fixed portion, a spring that is provided in a surrounding region of the support shaft between the base and the lock and is formed so as to be extendable in a direction in which the support shaft extends, and a vibration suppressor provided between two opposing surfaces of the spring portion that are adjacent to each other in a direction in which the support shaft extends and face each other.

A clamp and a clamp-equipped wire harness according to the present disclosure achieve the effect of being able to dampen vibration.

BRIEF DESCRIPTION OF THE DRAWINGS

FIGS. 2(*a*) and 2(*b*) are schematic cross-sectional views (cross-sectional views taken along 2-2 in FIG. 1) showing the clamp-equipped wire harness according to an embodiment.

DETAILED DESCRIPTION OF EMBODIMENTS

The following describes an embodiment with reference to the accompanying drawings. Note that, in the accompanying drawings, some of the components may be exaggerated or simplified for the sake of description. Also, the dimensional ratio of some parts may differ from their actual ratio.

Figure 1:
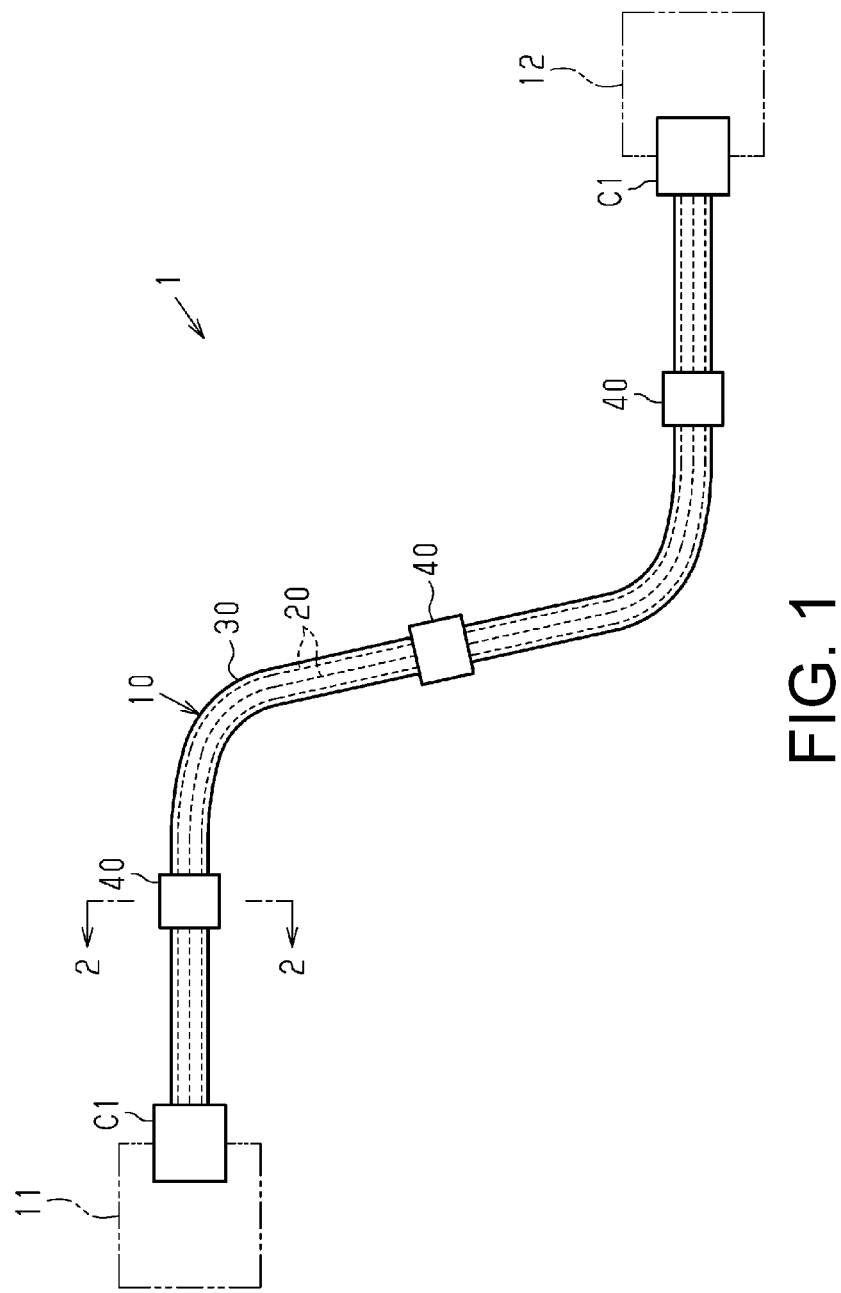
FIG. 1 is a schematic configuration diagram showing a clamp-equipped wire harness according to an embodiment.

A clamp-equipped wire harness 1 shown in FIG. 1 includes a wire harness 10 and one or more (three in this embodiment) clamps 40.

The wire harness 10 electrically connects two electrical apparatuses (devices), or three or more electric apparatuses (devices). The wire harness 10 electrically connects an inverter 11 disposed in a front part of a vehicle, such as a hybrid vehicle or an electric vehicle, and a high-voltage battery 12 installed in the vehicle rearward of the inverter 11, for example. The wire harness 10 is routed under the floor of the vehicle, for example. The inverter 11 is connected to a wheel driving motor (not shown), which is a power source for driving the vehicle. The inverter 11 generates AC power from DC power that is supplied from the high-voltage battery 12, and supplies the AC power to the motor. The high-voltage battery 12 is a battery that can supply a voltage of several hundred volts, for example.

The wire harness 10 includes one or more (two in the example) wires 20, a pair of connectors C1 respectively attached to two end portions of the wires 20, and an outer cover member 30 collectively enclosing the plurality of wires 20. One end portion of the wires 20 is connected to the inverter 11 via one of the connectors C1, and the other end portion of the wires 20 is connected to the high-voltage battery 12 via the other connector C1. Each wire 20 is elongated to extend in the front-rear direction of the vehicle, for example. Each wire 20 is formed so as to be bent into a two-dimensional shape or three-dimensional shape, for example. The wire 20 is bent into a predetermined shape corresponding to the wiring route of the wire harness 10, for example. The wires 20 are high-voltage wires that can handle high voltages and large currents, for example. The wires 20 may be non-shielded wires that have no electromagnetically shielded structure, for example, or may be shielded wires that have an electromagnetically shielded structure. The outer cover member 30 protects the wires 20 from flying objects and water droplets, for example. The outer cover member 30 in which the plurality of wires 20 are housed is fixed to a vehicle body or the like by the clamps 40.

As shown in FIG. 2(*a*), the wires 20 are coated wires each including a core wire 21 formed by a conductor and an insulating sheath 22 that covers the outer circumference of the core wire 21. A twisted wire obtained by twisting a plurality of bare metal wires together, a columnar conductor (a single core wire, a bus bar, or the like) constituted by one columnar metal rod that is solid, or a tubular conductor (a pipe conductor) that is hollow can be used for the core wire 21, for example. Also, a twisted wire, a columnar conductor, and a tubular conductor may be used in combination as the core wire 21. A metallic material such as a copper-based material or an aluminum-based material can be used as the material of the core wires 21, for example. The core wires 21 are formed through extrusion molding, for example.

The cross-sectional shape (i.e., a transverse cross-sectional shape) obtained by cutting a core wire 21 along a plane orthogonal to the length direction of the core wire 21 may be any shape. The transverse cross-sectional shape of each core wire 21 is a circular, semicircular, polygonal, square, or flat shape, for example. The transverse cross-sectional shape of the core wire 21 in this embodiment is a circular shape.

The insulating sheaths 22 respectively cover the entire outer circumferential surfaces of the core wires 21 in intimate contact therewith, for example. The insulating sheath 22 is made of an insulating material such as a synthetic resin, for example. The insulating sheath 22 can be formed through, for example, extrusion molding (extrusion coating) performed on the core wire 21.

The outer cover member 30 has an overall elongated tubular shape. The plurality of wires 20 are inserted into an internal space 30X of the outer cover member 30. The plurality of wires 20 are arranged side-by-side in the up-down direction of the vehicle in the internal space 30X, for example. The outer cover member 30 is formed so as to enclose the entire outer circumference of the plurality of wires 20. Metal pipes or resin pipes, resin protectors, flexible corrugated tubes made of resin or the like, waterproof rubber covers, or a combination thereof may be used for the outer cover member 30, for example. A metallic material such as a copper-based material or an aluminum-based material can be used as the material of a metal pipe. A conductive resin material or a resin material that has no conductivity can be used as the material of a resin protector or a resin corrugated tube, for example. It is possible to use a synthetic resin such as polyolefin, polyamide, polyester, or an ABS resin, for this resin material, for example. The outer cover member 30 in this example is a corrugated tube that has an accordion structure in which annular recesses and annular protrusions are arranged alternately in the length direction thereof.

The transverse cross-sectional shape of the outer cover member 30 may be any shape. The transverse cross-sectional shape of the outer cover member 30 is a circular, semicircular, polygonal, square, or flat shape, for example. The transverse cross-sectional shape of the outer cover member 30 in this embodiment is a circular shape. That is, the outer cover member 30 in this embodiment has a cylindrical shape.

As shown in FIG. 1, the plurality of clamps 40 are provided at predetermined intervals in the length direction of the wire harness 10. The clamps 40 are attached to the outer circumferential surface of the outer cover member 30.

As shown in FIG. 2(a), each clamp 40 has a holding portion 50 for holding the wire harness 10 and a fixing portion 60 to be fixed to a panel 200 of a vehicle body that is a fixed portion.

The holding portion 50 has an overall tubular shape (a cylindrical shape in this modification) large enough to be fitted to the outside of the outer cover member 30. The holding portion 50 can be opened by releasing locking between a locking portion 51 and a locked portion 52 that can be locked to each other. The wire harness 10 can be fitted to the inside of the holding portion 50 by opening the holding portion 50. Also, with the clamp 40, the wire harness 10 can be held inside the holding portion 50 by closing the holding portion 50. With the clamp 40, the closed state of the holding portion 50 is locked by locking the locking portion 51 to the locked portion 52. In a state in which the holding portion 50 is locked in this manner, the holding portion 50 encloses the entire outer circumference of the outer cover member 30, and the holding portion 50 can apply a predetermined fastening force to the portion thereof. Therefore, when the holding portion 50 is locked, the wire harness 10 (specifically, the outer cover member 30) is held by the holding portion 50. Note that at least a portion of the inner circumferential surface of the holding portion 50 is in contact with the outer circumferential surface of the outer cover member 30 in a state in which the holding portion 50 is locked.

It is possible to use a synthetic resin such as polyolefin, polyamide, polyester, or an ABS resin, as the material of the holding portion 50, for example. A metallic material such as an iron-based material or an aluminum-based material can be used as the material of the holding portion 50, for example.

The fixing portion 60 is formed in a portion of the outer circumferential surface of the holding portion 50. The fixing portion 60 is provided at a position of the outer circumferential surface of the holding portion 50 that is spaced apart from the locking portion 51 and the locked portion 52, for example. The fixing portion 60 shown in FIG. 2(a) is provided in a lower portion of the outer circumferential surface of the holding portion 50 in the up-down direction of the vehicle (i.e., in the up-down direction in FIG. 2(a)).

The fixing portion 60 includes a base portion 70 (base), a support shaft 80, a spring portion 90 (spring), and a vibration suppressing member 100 (vibration suppressor). The base portion 70 is formed as a single body with the holding portion 50, for example. The base portion 80 is formed as a single body with the holding portion 70, for example. In the clamp 40 of this embodiment, the holding portion 50, the base portion 70, and the support shaft 80 are formed as a single component. The holding portion 50, the base portion 70, and the support shaft 80 are molded as a single resin molded article, for example. The spring portion 90 and the vibration suppressing member 100 are formed separately from the base portion 70 and the support shaft 80, for example. The spring portion 90 is formed separately from the vibration suppressing member 100, for example.

The base portion 70 is formed in a flat plate shape having a first surface 70A (an upper surface in this embodiment) connected to the holding portion 50 and a second surface 70B (a lower surface in this embodiment) located opposite to the first surface 70A. The planar shape of the base portion 70 is a rectangular shape, for example. The holding portion 50 is installed in a substantially central portion of the first surface 70A of the base portion 70, for example. Here, in this specification, a "plan view" refers to viewing an object from a normal direction (the up-down direction in FIG. 2) of the first surface 70A of the base portion 70, and a "planar shape" refers to a shape of an object when viewed from the normal direction of the first surface 70A of the base portion 70.

One end portion of the second surface 70B of the base portion 70 is provided with an accommodation portion 71 in which a portion of the spring portion 90 is accommodated. The accommodation portion 71 has a U-shaped cross-section, for example. In this embodiment, the cross-sectional shape of the accommodation portion 71 obtained by cutting the accommodation portion 71 along a plane that is orthogonal to the length direction of the wire harness 10 is U-shaped. The accommodation portion 71 has an extension portion 72 that extends from one end portion of the second surface 70B of the base portion 70 in the direction in which the support shaft 80 extends, and a folded-back portion 73 that extends from a leading end portion of the extension portion 72 so as to be folded back to the inner side of the base portion 70, for example. The accommodation portion 71 is constituted by the space surrounded by the second surface 70B, the extension portion 72, and the folded-back portion 73 of the base portion 70, for example. The accommodation portion 71 is formed extending over the entire length of one side that constitutes the outer shape of the base portion 70, for example.

The support shaft 80 is formed in the central portion of the second surface 70B of the base portion 70, for example. A base end portion of the support shaft 80 is connected to the second surface 70B of the base portion 70. The support shaft 80 has a columnar shape extending from the second surface 70B of the base portion 70 in a direction away from the holding portion 50. The support shaft 80 is formed so as to extend along the radial direction of the holding portion 50, for example. The support shaft 80 in this embodiment has a round columnar shape.

The leading end portion of the support shaft 80 is provided with a locking portion 81 (lock). The locking portion 81 is formed to be able to be inserted into and locked to an attachment hole 200X formed in the panel 200 of the vehicle body. The locking portion 81 is formed so as to be elastically deformable so as to be insertable into the attachment hole 200X, and to be able to be locked to the panel 200 at a circumferential edge of the attachment hole 200X after the locking portion 81 is inserted into the attachment hole 200X. The locking portion 81 is continuous with the support shaft 80 as a single body.

The locking portion 81 has a pair of blade portions 82 that protrude from the leading end portion of the support shaft 80 so as to be folded back toward the base end portion of the support shaft 80, and locking steps 83 that are respectively formed at protruding leading ends of the blade portions 82 and have a step shape. The locking portion 81 is U-shaped, for example. The two blade portions 82 are formed to hold the support shaft 80 from two sides. Each blade portion 82 is formed to be spaced apart from the support shaft 80, for example. The locking steps 83 are respectively formed on protruding leading end surfaces of the blade portions 82, for example. The locking steps 83 are formed in the manner of notches in the outer circumferential portions of the protruding leading end surfaces of the blade portions 82 that are distant from the support shaft 80. The width of a portion of the locking portion 81 that is the widest in the direction that is orthogonal to the direction in which the support shaft 80 extends is wider than the opening width of the attachment hole 200X. Also, with the locking portion 81, the width between the two locking steps 83 is set to a width that is substantially the same as the opening width of the attachment hole 200X.

The locking portion 81 is elastically deformable such that the distance between the two blade portions 82 is reduced. That is, the locking portion 81 is elastically deformable such that the blade portions 82 approach the support shaft 80. When the locking portion 81 is inserted into the attachment hole 200X, the locking portion 81 elastically deforms such that the distance between the two blade portions 82 is temporarily reduced, for example. Then, when the locking portion 81 passes through the attachment hole 200X, the locking portion 81 elastically returns such that the two blade portions 82 return to their original shape, that is, the locking portion 81 elastically returns such that the distance between the two blade portions 82 is widened. At this time, the locking steps 83 of the locking portion 81 are locked to the circumferential edge of the attachment hole 200X. Accordingly, the clamp 40 is fixed to the panel 200 of the vehicle body, and the wire harness 10 held by the clamp 40 is fixed to the vehicle body.

Similarly to the holding portion 50, it is possible to use a synthetic resin such as polyolefin, polyamide, polyester, or an ABS resin, as the material of the base portion 70, the support shaft 80, and the locking portion 81, for example. A metallic material such as an iron-based material or an aluminum-based material can also be used as the material of the base portion 70, the support shaft 80, and the locking portion 81, for example.

The spring portion 90 is provided between the base portion 70 and the locking portion 81. The spring portion 90 is formed so as to be extendable in the direction in which the support shaft 80 extends. The spring portion 90 has a U-shaped cross-section, for example. The spring portion 90 has a wave shaped cross-section in which an S shape continues in the direction in which the support shaft 80 extends, for example. A metallic material such as a copper-based material or an iron-based material can be used as the material of the spring portion 90, for example.

Figure 3:
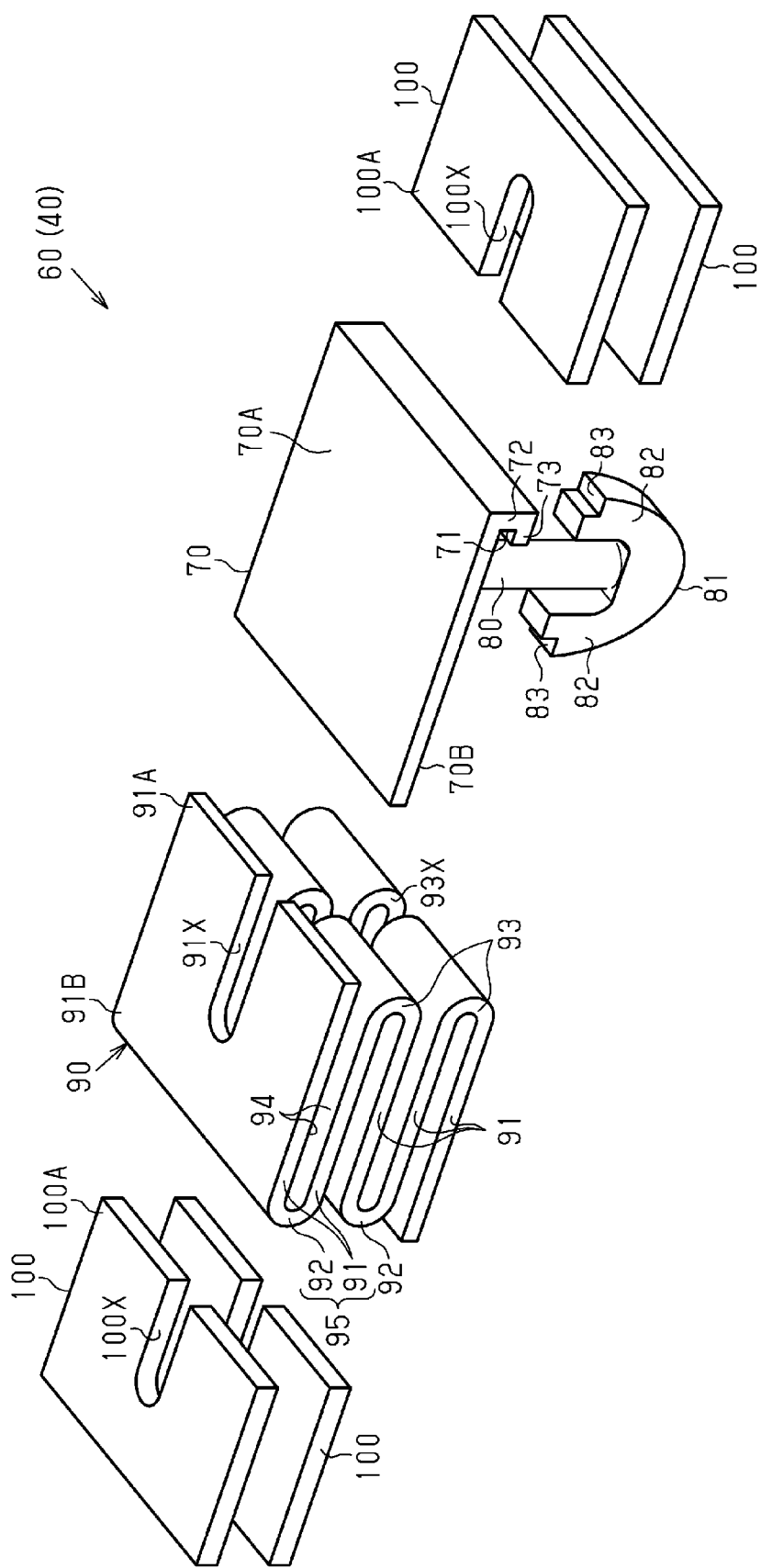
FIG. 3 is a schematic exploded perspective view showing a fixing portion of a clamp according to an embodiment.

As shown in FIG. 3, the spring portion 90 is U-shaped in a side view, for example. The spring portion 90 has a wave shape in which an S shape continues in the direction in which the support shaft 80 extends in a side view, for example. The spring portion 90 in this embodiment is formed in a wave shape in which an S-shape continues by bending an elastic plate member in a zigzag manner.

The spring portion 90 includes a plurality (five in this embodiment) plate members 91 that are arranged side-by-side along the direction in which the support shaft 80 extends, and a plurality of elastic deformation portions 92 and 93 that connect plate members 91 that are adjacent to each other in the direction in which the support shaft 80 extends. The elastic deformation portions 92 and the elastic deformation portions 93 are arranged in an alternating manner in a side view. The spring portion 90 is a single component in which the plurality of plate members 91 and the plurality of elastic deformation portions 92 and 93 are continuous with each other as a single body, for example.

Each plate member 91 has opposing surfaces 94 that face the other plate member 91 adjacent in the direction in which the support shaft 80 extends. The plate members 91 have a flat plate shape, for example. The plate members 91 have a rectangular shape in a plan view, for example.

An end portion 91A (one end portion) of each plate member 91 is provided with a notch portion 91X (notch), for example. Each notch portion 91X is formed at the end portion 91A that constitutes one of the four sides forming the outer shape of the plate member 91 having a rectangular shape in a plan view, for example. The notch portion 91X is formed so as to extend from the end portion 91A toward the plane central portion of the spring portion 90, for example. The notch portion 91X is formed so as to extend from the end portion 91A to the plane central portion of the spring portion 91 linearly or in a band shape, for example. The notch portions 91X are formed to pass through the plate members 91 in the thickness direction. The width of each notch portion 91X is set to a width into which the support shaft 80 can be inserted. An end portion of the notch portion 91X has a shape corresponding to the outer circumferential surface of the support shaft 80. The end portion of the notch portion 91X in this embodiment has a round semicolumnar shape corresponding to the outer circumferential surface of the round columnar support shaft 80. The notch portions 91X that are respectively formed in the plurality of plate members 91 are formed at positions where the notch portions 91X overlap each other in the direction in which the support shaft 80 extends.

The elastic deformation portions 92 are formed so as to connect end portions 91B of plate members 91 that are adjacent to each other in the direction in which the support shaft 80 extends. Here, each end portion 91B constitutes one of the four sides that constitute the outer shape of each plate member 91 having a rectangular shape in a plan view, specifically, the opposite side to the side constituted by the end portion 91A. The elastic deformation portions 92 are U-shaped, for example. With the spring portion 90 shown in FIG. 3, the end portion 91B of the plate member 91 located at the uppermost position in FIG. 3 and the end portion 91B of the second plate member 91 from the top are connected to each other by the corresponding elastic deformation portion 92, and the end portion 91B of the third plate member 91 from the top and the end portion 91B of the fourth plate member 91 from the top are connected to each other by the corresponding elastic deformation portion 92.

The elastic deformation portions 93 are formed so as to connect end portions 91A of plate members 91 that are adjacent to each other in the direction in which the support shaft 80 extends. The elastic deformation portions 93 are U-shaped, for example. With the spring portion 90 shown in FIG. 3, the end portion 91A of the second plate member 91 from the top and the end portion 91A of the third plate member 91 from the top are connected to each other by the corresponding elastic deformation portion 93, and the end portion 91A of the fourth plate member 91 from the top and the end portion 91A of the plate member 91 located on the lowermost side are connected to each other by the corresponding elastic deformation portion 93. Each elastic deformation portion 93 is provided with a through-hole portion 93X. The through-hole portion 93X is formed to be in communication with the notch portion 91X of the plate member 91. The size of the through-hole portion 93X is set to a size large enough that the support shaft 80 is insertable therein.

In the spring portion 90, a first plate spring 95 is constituted by a pair of plate members 91 that are adjacent to each other in the direction in which the support shaft 80 extends, and the elastic deformation portions 92 and 93 that connect the two plate members 91. The first plate spring 95 is U-shaped. The spring portion 90 in this embodiment is constituted by four plate springs 95 that are continuous with each other. At this time, two plate springs 95 that are adjacent to each other in the direction in which the support shaft 80 extends share one plate member 91 located in the central portion of the two plate springs 95.

The spring portion 90 described above is inserted between the base portion 70 and the locking portion 81 in a state in which the end portions 91A of the plate members 91, that is, the end portions 91A on the side where the notch portions 91X and the through-hole portions 93X are formed, face the support shaft 80. Specifically, the spring portion 90 moves in a direction that is orthogonal to the direction in which the support shaft 80 in a state in which the end portions 91A of the plate members 91 face the support shaft 80 and is inserted between the base portion 70 and the locking portion 81. At this time, the support shaft 80 is inserted into the through-hole portions 93X and the notch portions 91X. Also, the end portion 91A of the plate member 91 located on the uppermost side of the spring portion 90 in the drawings is accommodated in the accommodation portion 71 of the base portion 70. When the outer circumferential surface of the support shaft 80 is adjacent to the end portion of the notch portion 91X, for example, the end portion 91A of the plate member 91 located on the uppermost side in the drawing comes into contact with the inner circumferential surface of the extension portion 72 of the accommodation portion 71. Accordingly, one end portion of the spring portion 90 is locked to the accommodation portion 71, and the spring portion 90 is positioned.

The vibration suppressing member 100 is provided between two opposing surfaces 94 of the spring portion 90 that are adjacent to each other in the direction in which the support shaft 80 extends and face each other. The vibration suppressing member 100 in this embodiment is provided so as to be interposed between two plate members 91 of the spring portion 90 that are adjacent to each other in the direction in which the support shaft 80 extends. That is, the vibration suppressing member 100 is provided so as to be interposed between two plate members 91 that constitute the plate spring 95. In the fixing portion 60 in this embodiment, four plate springs 95 are respectively provided with the vibration suppressing members 100. That is, the fixing portion 60 in this embodiment has four vibration suppressing members 100.

Each vibration suppressing member 100 is formed in a sheet shape, for example. Each vibration suppressing member 100 is formed in a rectangular shape in a plan view, for example. Each vibration suppressing member 100 has a predetermined thickness. An end portion 100A of each vibration suppressing member 100 is provided with a notch portion 100X, for example. Each notch portion 100X is formed at the end portion 100A that constitutes a side, which faces the support shaft 80, of the four sides forming the outer shape of the vibration suppressing member 100 having a rectangular shape in a plan view, for example. The notch portion 100X is formed so as to extend from the end portion 100A to the central portion of the vibration suppressing member 100 linearly or in a band shape, for example. The notch portions 100X are formed to pass through the vibration suppressing members 100 in the thickness direction. The width of each notch portion 100X is set to a width into which the support shaft 80 can be inserted. An end portion of the notch portion 100X has a shape corresponding to the outer circumferential surface of the support shaft 80. The end portion of the notch portion 100X in this embodiment has a round semicolumnar shape corresponding to the outer circumferential surface of the round columnar support shaft 80. The notch portions 100X that are respectively formed in the plurality of vibration suppressing member 100 are formed at positions where the notch portions 100X overlap each other in the direction in which the support shaft 80 extends.

Each vibration suppressing member 100 is inserted between two plate members 91 in a state in which the end portion 100A on the side where the notch portion 100X is formed faces the support shaft 80, with respect to the spring portion 90 disposed between the base portion 70 and the locking portion 81, for example. At this time, the support shaft 80 is inserted into the notch portions 100X in the vibration suppressing members 100.

A material having impact absorbing properties better than those of the base portion 70 and the support shaft 80 can be used as the material of the vibration suppressing members 100, for example. A material having impact absorbing properties better than those of the spring portion 90 can be used as the material of the vibration suppressing members 100, for example. A viscoelastic body having higher viscoelasticity and softness than the material constituting the base portion 70 and the material constituting the spring portion 90 can be used as the material of the vibration suppressing members 100, for example. A rubber material or a foam material can be used as the material of the vibration suppressing members 100, for example. Silicone rubber, urethane rubber, acrylic rubber, nitrile rubber, butyl rubber, ethylene propylene rubber, or the like can be used as the rubber material, for example. The material of the vibration suppressing members 100 is selected in consideration of both the spring properties of the spring portion 90 and the vibration dampening properties of the vibration suppressing members 100, for example. A solid material or a gel-like (semisolid) material can be used as the material of the vibration suppressing members 100, for example.

As shown in FIG. 2(a), each vibration suppressing member 100 is in contact with at least one of the two opposing surfaces 94 that are adjacent to each other in the direction in which the support shaft 80 extends and face each other in the spring portion 90 in the natural state in which no external force is applied, for example. The vibration suppressing member 100 in this embodiment is in contact with two opposing surfaces 94 in the spring portion 90 in the natural state. Also, each vibration suppressing member 100 is adhered to one of the two opposing surfaces 94, for example.

As shown in FIG. 2(b), each vibration suppressing member 100 is in contact with two opposing surfaces 94 in the spring portion 90 in a compressed state, for example. As shown in FIG. 2(b), when the spring portion 90 in the natural state shown in FIG. 2(a) is compressed in the direction in which the support shaft 80 extends, accompanying vibration or the like of the vehicle body, the elastic deformation portions 92 and 93 elastically deform, and the distance between two opposing surfaces 94 is reduced, for example. The vibration suppressing member 100 also elastically deforms accompanying such elastic deformation of the spring portion 90. The vibration energy can be absorbed according to the deformation amount and the deformation speed of the vibration suppressing member 100 at this time, and the vibration transmitted from the clamp 40 to the wire harness 10 can be dampened. Note that the elastically deformed vibration suppressing member 100 is formed so as to be thinner than the vibration suppressing member 100 (see FIG. 2(a)) when the spring portion 90 is in the natural state, and to extend in the surface direction, for example. The vibration suppressing member 100 in this case is formed to fill the space between two opposing surfaces 94, for example.

Next, the effects of this embodiment will be described.

(1) The spring portion 90 that is extendable in the direction in which the support shaft 80 extends is provided in a surrounding region of the support shaft 80 whose leading end is provided with the locking portion 81. According to this configuration, when the panel 200 of the vehicle body vibrates while the vehicle is traveling, for example, it is possible to absorb impact transmitted from the clamp 40 to the wire harness 10 due to elastic deformation of the spring portion 90. Furthermore, a vibration suppressing member 100 is provided between two opposing surfaces 94 of the spring portion 90 that are adjacent to each other in the direction in which the support shaft 80 extends and face each other. According to this configuration, when the panel 200 of the vehicle body vibrates, the vibration energy can be absorbed according to the deformation amount and the deformation speed of the vibration suppressing member 100. Accordingly, the single vibration of the spring portion 90 can be dampened, and vibration transmitted from the clamps 40 to the wire harness 10 can be dampened. As a result, it is possible to suppress the occurrence of problems such as disconnection of the wires 20 and breakage of the clamps 40 due to vibration.

(2) The spring portion 90 is constituted by the plate springs 95 that each have two plate members 91 that are adjacent to each other in the direction in which the support shaft 80 extends and the elastic deformation portions 92 and 93 that connect end portions of the two plate members 91, and the vibration suppressing member 100 is provided between two plate members 91. According to this configuration, it is possible to secure a wide area of the opposing surfaces 94 of two plate members 91, and to secure a wide area of contact between the plate members 91 and the vibration suppressing members 100. Accordingly, it is possible to stably obtain a vibration dampening function of the vibration suppressing member 100.

Also, because the plate spring 95 is formed in a U-shape by two plate members 91 and the elastic deformation portion 92 (or the elastic deformation portion 93), each vibration suppressing member 100 can be easily inserted between two plate members 91.

(3) The spring portion 90 is formed into a structure in which multiple plate springs 95 are continuous with each other in multiple levels in the direction in which the support shaft 80 extends. According to this configuration, the spring constant of the spring portion 90 can be easily adjusted by adjusting the number of levels of the plate springs 95.

(4) Incidentally, if the spring portion 90 is constituted by a coil spring as in a conventional technique, the support shaft 80 needs to be inserted into the center of the coil spring in order to arrange the support shaft 80 in the vicinity of the plane central portion of the spring portion 90. In this case, the coil spring needs to be formed to a size large enough that the locking portion 81 formed at the leading end of the support shaft 80 is insertable therein, resulting in an increase in the size of the spring portion 90. Also, if two coil springs are provided such that the support shaft 80 is interposed therebetween, workability of attaching a coil spring decreases due to an increase in the number of components.

To address this, in the spring portion 90 of this embodiment, the end portion 91A of each plate member 91 is provided with the notch portion 91X that extends from the end portion 91A toward the plane central portion of the spring portion 90 and into which the support shaft 80 is insertable. Furthermore, each notch portion 91X is formed so as to extend in a direction intersecting the direction in which the support shaft 80 extends and pass through the plate member 91 in the thickness direction. According to this configuration, it is possible to attach the spring portion 90 to the support shaft 80 by sliding the plate member 91 with respect to the support shaft 80 from the direction intersecting the direction in which the support shaft 80 extends, and inserting the support shaft 80 into the notch portion 91X from the end portion 91A of the plate member 91. Accordingly, it is possible to attach the spring portion 90 to the support shaft 80 without interference by the locking portion 81. At this time, the notch portion 91X is formed so as to extend toward the plane central portion of the spring portion 90. Thus, the support shaft 80 can be arranged in the vicinity of the plane central portion of the spring portion 90 by inserting the support shaft 80 to the end portion of the notch portion 91X. Accordingly, the support shaft 80 can be arranged in the vicinity of the plane central portion of the spring portion 90 without increasing the size of the spring portion 90. Also, due to the support shaft 80 being arranged in the vicinity of the plane central portion of the spring portion 90, it is possible to stably obtain the impact absorbing function of the spring portion 90 and stably obtain the vibration dampening function of the vibration suppressing member 100. Furthermore, the spring portion 90 can be constituted by a single component, and thus it is possible to improve workability for assembling the spring portion 90.

(5) The elastic deformation portion 93 is provided with the through-hole portion 93X into which the support shaft 80 is insertable such that the through-hole portion 93X is in communication with the notch portion 91X. According to this configuration, even in a state in which the elastic deformation portion 93 provided with the through-hole portion 93X faces the support shaft 80, it is possible to attach the spring portion 90 to the support shaft 80 by sliding the plate member 91 with respect to the support shaft 80 from the direction intersecting the direction in which the support shaft 80 extends.

(6) The vibration suppressing member 100 is formed in a sheet shape. According to this configuration, it is possible to easily insert the vibration suppressing member 100 between two opposing surfaces 94.

(7) The base portion 70 is provided with the accommodation portion 71 in which a portion of the spring portion 90 is accommodated. According to this configuration, the spring portion 90 can be positioned by accommodating a portion of the spring portion 90 in the accommodation portion 71. Accordingly, even if vibration is applied to the clamp 40, for example, it is possible to inhibit displacement of the spring portion 90.

Other Embodiments

The above-described embodiment can be modified as follows. The above-described embodiment and the following modifications may be combined to the extent that they do not contradict each other technically.

Figure 4:
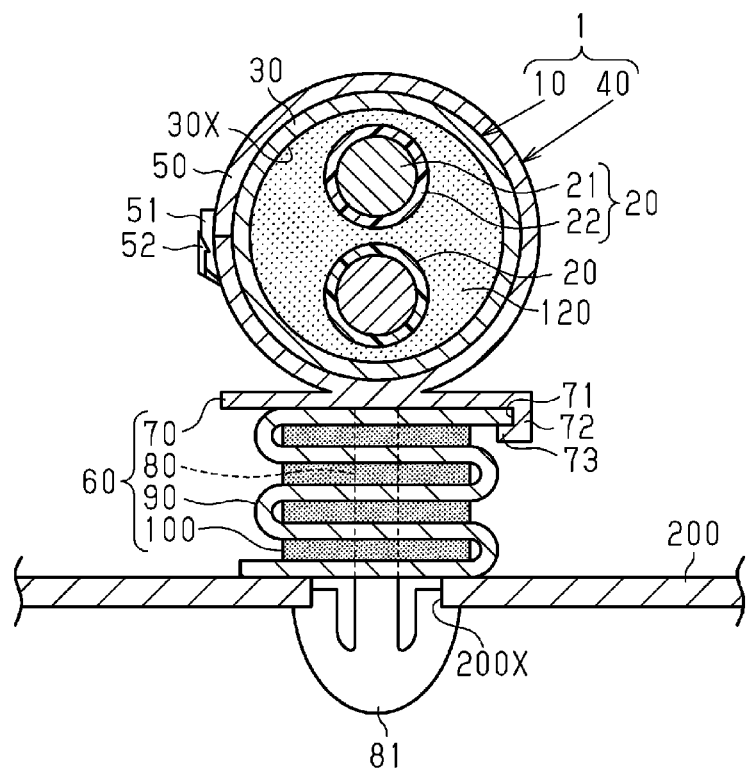
FIG. 4 is a schematic cross-sectional view showing a clamp-equipped wire harness according to a modification example.

As shown in FIG. 4, the internal space 30X of the outer cover member 30 may be provided with a spacer 120. The spacer 120 is provided in a portion enclosed by the holding portion 50 of the clamp 40 in the length direction of the outer cover member 30, for example. The spacer 120 is formed so as to fill the space between the outer circumferential surfaces of the wires 20 and the inner circumferential surface of the outer cover member 30. The spacer 120 covers the entire outer circumferential surfaces of the wires 20 in intimate contact therewith, for example. The spacer 120 covers the entire inner circumferential surface of the outer cover member 30 in intimate contact therewith, for example. This spacer 120 functions as a wire holding portion for holding the wires 20.

It is possible to use a material similar to that of the vibration suppressing member 100 as the material of the spacer 120, for example. A rubber material or a foam material can be used as the material of the spacer 120, for example. Silicone rubber, urethane rubber, acrylic rubber, nitrile rubber, butyl rubber, ethylene propylene rubber, or the like can be used as the rubber material, for example.

By providing the above-described spacer 120, it is possible to suppress rattling of the wires 20 in the outer cover member 30. Accordingly, even if vibration is transmitted from the panel 200 side to the wire harness 10 via the clamp 40, for example, it is possible to suppress vibration of the wires 20 caused by the transmitted vibration. Thus, it is possible to favorably suppress disconnection of the wires 20 caused by vibration.

In a modification example shown in FIG. 4, the spacer 120 may be provided over substantially the entire length of the outer cover member 30 in the length direction.

In the modification example shown in FIG. 4, a gap may be present between the outer circumferential surface of the spacer 120 and the inner circumferential surface of the outer cover member 30.

In the modification example shown in FIG. 4, a gap may be present between the inner circumferential surface of the spacer 120 and the outer circumferential surfaces of the wires 20.

Figure 5:
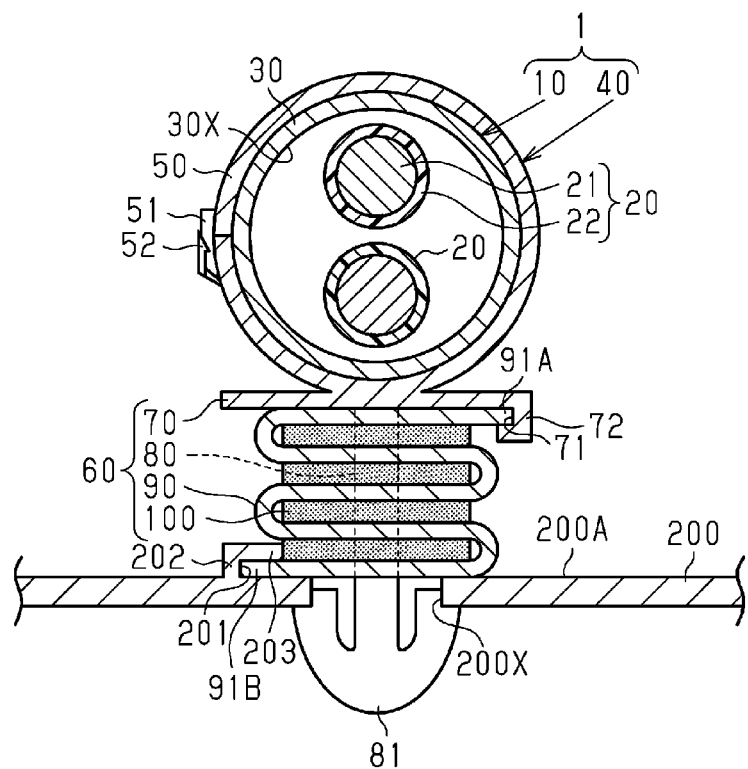
FIG. 5 is a schematic cross-sectional view showing a clamp-equipped wire harness according to a modification example.

As shown in FIG. 5, the panel 200 of the vehicle body may be provided with an accommodation portion 201 in which a portion of the spring portion 90 is accommodated. The accommodation portion 201 is formed on an attachment surface 200A of the panel 200 in the vicinity of the attachment hole 200X. The accommodation portion 201 has a U-shaped cross-section, for example. The accommodation portion 201 includes an extension portion 202 that extends in the direction in which the support shaft 80 extends, from the attachment surface 200A at a position located a predetermined distance away from the opening end of the attachment hole 200X, and a protruding portion 203 that extends from a leading end of the extension portion 202 substantially horizontally toward the attachment hole 200X side. The accommodation portion 201 is constituted by the space surrounded by the attachment surface 200A, the extension portion 202, and the protruding portion 203 of the panel 200.

The accommodation portion 201 is provided at a position where the accommodation portion 201 does not overlap the accommodation portion 71 of the base portion 70 in the direction in which the support shaft 80 extends, for example. The accommodation portion 201 is provided on the side opposite to the accommodation portion 71 with respect to the attachment hole 200X, for example. In this case, one end portion of the spring portion 90 is accommodated in the accommodation portion 71, and the other end portion of the spring portion 90 is accommodated in the accommodation portion 201. Accordingly, it is possible to hold the spring portion 90 from two sides, and favorably suppress displacement of the spring portion 90.

The vibration suppressing members 100 are respectively provided for the plate springs 95 in multiple levels that constitute the spring portion 90 in the above-described embodiment. There is no limitation thereto, and a vibration suppressing member may be formed as a single body with multiple plate springs 95.

Figures 6, 7:
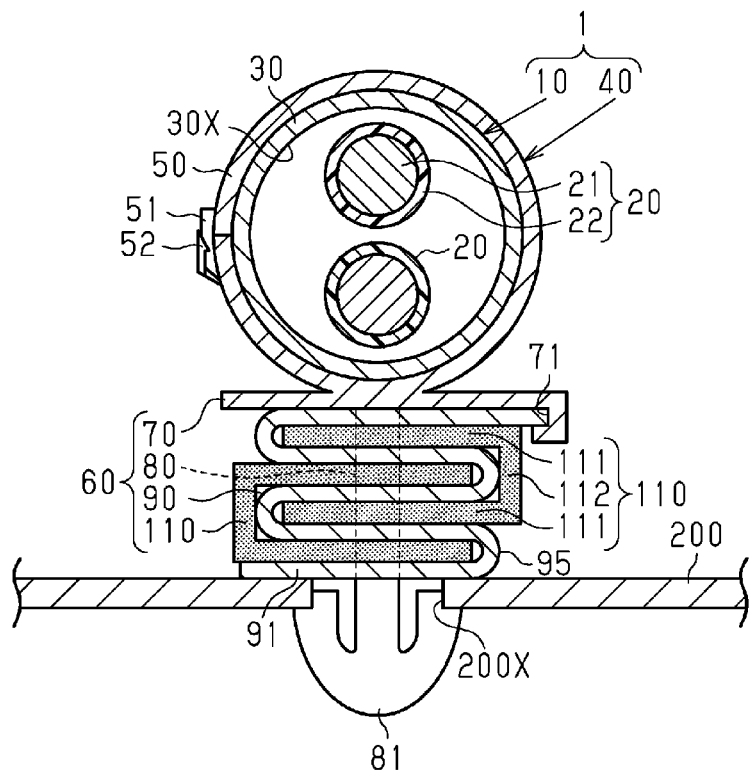
FIG. 6 is a schematic cross-sectional view showing a clamp-equipped wire harness according to a modification example.
FIG. 7 is a schematic cross-sectional view showing a clamp-equipped wire harness according to a modification example.

As shown in FIG. 6, two plate springs 95 may be provided with one vibration suppressing member 110, for example. The vibration suppressing member 110 in this case has a plurality of interposing portions 111 provided between two plate members 91, and a connection portion 112 connecting the plurality of interposing portions 111, for example. Specifically, one vibration suppressing member 110 includes an interposing portion 111 provided between the first plate member 91 and the second plate member 91 from the top, an interposing portion 111 provided between the third plate member 91 and the fourth plate member 91 from the top, and the connection portion 112 connecting these two interposing portions 111. This vibration suppressing member 110 has a U-shaped cross-section. In the example shown in FIG. 6, one vibration suppressing member 110 is provided to the first plate spring 95 and the third plate spring 95 from the top in this manner. Furthermore, in the example shown in FIG. 6, one vibration suppressing member 110 is also provided to the second plate spring 95 and the fourth plate spring 95 from the top in a similar manner. According to this configuration, it is possible to reduce the number of components of the vibration suppressing member 110 provided to multiple plate springs 95, and thus to shorten the work time taken to attach the vibration suppressing member 110.

Although one vibration suppressing member 110 is provided to two plate springs 95 in the modification example shown in FIG. 6, one vibration suppressing member may be provided to three or more plate springs 95.

Although the vibration suppressing member 100 is provided so as to be in contact with two opposing surfaces 94 of the spring portion 90 in the natural state in the above-described embodiment, there is no limitation thereto.

As shown in FIG. 7, for example, the vibration suppressing member 100 may be provided so as to be in contact with only one of two opposing surfaces 94 of the spring portion 90 in the natural state. The vibration suppressing member 100 in this case is smaller than the distance between two opposing surfaces 94 in the spring portion 90 in the natural state.

The vibration suppressing members 100 are respectively provided for all the plate springs 95 constituting the spring portion 90 in the above-described embodiment. There is no limitation thereto, and the vibration suppressing member 100 may be provided to only at least one of the plate springs 95 in multiple levels that constitute the spring portion 90, for example.

Note that the number and thickness of vibration suppressing members 100 are selected as appropriate in consideration of both the spring properties of the spring portion 90 and the vibration dampening properties of the vibration suppressing members 100, for example.

Although the spring portion 90 is arranged in a surrounding region of the support shaft 80 by sliding the spring portion 90 in a state in which the end portions 91A provided with the elastic deformation portions 93 face the support shaft 80 in the above-described embodiment, the direction in which the spring portion 90 is inserted is not limited thereto. The spring portion 90 may be arranged in a surrounding region of the support shaft 80 by sliding the spring portion 90 in a state in which, out of the end portions of the plate members 91, end portions that are not provided with the elastic deformation portions 93 and 92 face the support shaft 80, for example. In this case, the end portions of the plate members 91 that face the support shaft 80 are provided with notch portions. Also, in this case, it is possible to omit the formation of the through-hole portions 93X in the elastic deformation portions 93.

There is no particular limitation to the direction in which the vibration suppressing member 100 is inserted in the above-described embodiment. The vibration suppressing member 100 may be inserted from, out of the end portions of the plate member 91, the end portion side where no elastic deformation portions 92 or 93 are formed, for example.

Although each vibration suppressing member 100 is provided with the notch portion 100X in the above-described embodiment, the formation of the notch portions 100X may be omitted. In this case, each vibration suppressing member 100 may be formed to a size so as not to interfere with the support shaft 80 between two opposing surfaces 94, for example. Also, a plurality of vibration suppressing members 100 may be provided between two opposing surfaces 94.

In the above-described embodiment, a configuration is adopted in which a vibration suppressing member 100 is arranged between two opposing surfaces 94 by inserting the sheet-shaped vibration suppressing member 100 between two opposing surfaces 94. There is no limitation thereto, and the vibration suppressing member 100 may be arranged between two opposing surfaces 94 by applying a liquid viscoelastic body to the two opposing surfaces using a spray device, for example. Also, in addition to spray coating, a known method such as brush coating or immersion may be used as a coating method. Also, the vibration suppressing member 100 may be formed between two opposing surfaces 94 through molding or the like.

Although the spring portion 90 is formed into a structure in which multiple plate springs 95 are continuous with each other in multiple levels in the direction in which the support shaft 80 extends in the above-described embodiment, there is no particular limitation to the number of levels of the plate springs 95. The number of levels of the plate springs 95 in the spring portion 90 may be one to three, or five or more.

Although a structure in which the spring portion 90 has the plate springs 95 is adopted in the above-described embodiment, there is no limitation thereto. The spring portion 90 may be constituted by a coil spring, for example. In this case as well, a vibration suppressing member 100 is provided between two opposing surfaces of a winding wire that is helically wound, the two opposing surfaces being adjacent to each other in the direction in which the support shaft 80 extends and facing each other. Accordingly, it is possible to obtain the same effects as those of (1) in the above-described embodiment.

There is no particular limitation on the shape of the locking portion 81 in the above-described embodiment. The shape of the locking portion 81 is not particularly limited as long as the locking portion 81 can be inserted into and locked to the attachment hole 200X in the panel 200.

There is no particular limitation on the shape of the holding portion 50 in the above-described embodiment. There is no particular limitation on the shape of the holding portion 50 as long as the holding portion 50 can hold the wire harness 10.

Although the holding portion 50 and the base portion 70 are formed as a single body in the above-described embodiment, the holding portion 50 and the base portion 70 may be formed separately from each other, for example.

All clamps 40 attached to the wire harness 10 in the above-described embodiment need not have the same structure. A structure may be adopted in which only one of three clamps 40 has the vibration suppressing member 100 and the remaining two clamps 40 do not have the vibration suppressing member 100, for example.

Although not specifically mentioned in the above-described embodiment, a configuration may be adopted in which an electromagnetic shielding member is provided inside the outer cover member 30. The electromagnetic shielding member is provided so as to collectively enclose a plurality of wires 20, for example. The electromagnetic shielding member is provided between the inner circumferential surface of the outer cover member 30 and the outer circumferential surfaces of the wires 20, for example. It is possible to use a flexible braided wire or metal film as an electromagnetic shielding member, for example. Also, it is possible to use a braided wire in which multiple bare metal wires are braided, and a braided wire in which a bare metal wire and a bare resin wire are braided together, as a braided wire. It is possible to use reinforced fibers with good insulating properties and shear resistance, such as para-aramid fibers, as a bare resin wire, for example.

Although the outer cover member 30 is formed in a substantially perfect cylindrical shape in the above-described embodiment, there is no limitation thereto, and the outer cover member 30 may be formed in an elliptical cylindrical shape or a rectangular cylindrical shape.

Although two wires 20 are inserted into the inside of the outer cover member 30 in the above-described embodiment, there is no particular limitation thereto, and the number of wires 20 can be changed according to the specifications of a vehicle. The number of wires to be inserted into the inside of the outer cover member 30 may be one, three or more. A configuration may be adopted in which a low-voltage wire for connecting a low-voltage battery and various low-voltage devices (e.g., lamps and car audio devices) is added as a wire to be inserted into the outer cover member 30, for example. Also, only low-voltage wires may be used.

The outer cover member 30 may be omitted from the above-described embodiment.

The arrangement relationship between the inverter 11 and the high-voltage battery 12 in a vehicle is not limited to that of the above-described embodiment, and may be changed as appropriate according to the configurations of a vehicle.

Although the inverter 11 and the high-voltage battery 12 are adopted as electrical devices to be connected by the wire harness 10 in the above-described embodiment, there is no limitation thereto. This disclosure may be applied to a wire for connecting the inverter 11 and a wheel driving motor, for example. That is, it is applicable as long as electrical devices mounted in a vehicle can be electrically connected to each other.

The invention claimed is:

1. A clamp comprising:
a holding portion configured to hold a wire harness; and
a fixing portion that is provided in a portion of an outer circumferential surface of the holding portion and is to be fixed to a fixed portion;
wherein the fixing portion includes:
  a base,
  a support shaft that extends from the base in a direction away from the holding portion,
  a lock that is provided at a leading end of the support shaft and is formed to be able to be locked to the fixed portion,
  a spring that is provided in a surrounding region of the support shaft between the base and the lock, and is formed so as to be extendable in a direction in which the support shaft extends, and
  a vibration suppressor provided between two opposing surfaces of the spring that are adjacent to each other in a direction in which the support shaft extends and face each other.

2. The clamp according to claim 1, wherein:
the spring includes a plate spring that includes two plate members that are adjacent to each other in the direction in which the support shaft extends, and an elastic deformation portion connecting end portions of the two plate members, and
the vibration suppressor is provided between the two plate members.

3. The clamp according to claim 2,
wherein the spring is formed by the plate spring in a plurality of levels connected to each other in the direction in which the support shaft extends, and has a wave-shaped cross-section in which an S-shape continues in the direction in which the support shaft extends.

4. The clamp according to claim 2, wherein:
one end of each plate member is provided with a notch that extends from the one end toward a plane central portion of the spring and into which the support shaft is insertable, and
the notch is formed so as to extend in a direction intersecting the direction in which the support shaft extends and pass through the plate member in a thickness direction.

5. The clamp according to claim 4,
wherein the elastic deformation portion is provided with a through-hole into which the support shaft is insertable such that the through-hole is in communication with the notch.

6. The clamp according to claim 1,
wherein the vibration suppressor is formed in a sheet shape.

7. The clamp according to claim 1,
wherein the base is provided with an accommodation portion in which a portion of the spring is accommodated.

8. A clamp-equipped wire harness comprising:
the clamp according to claim 1; and
the wire harness held by the holding portion.

9. The clamp-equipped wire harness according to claim 8, wherein the wire harness includes
a wire,
an outer cover in which the wire is accommodated and whose outer circumference is enclosed by the holding portion,
a spacer provided in an internal space of the outer cover in a portion enclosed by the holding portion, and
the spacer is formed so as to fill a space between an outer circumferential surface of the wire and an inner circumferential surface of the outer cover.

* * * * *